US012737905B2

(12) United States Patent
Wang et al.

(10) Patent No.: US 12,737,905 B2
(45) Date of Patent: Sep. 15, 2026

(54) DEPTH DATA MEASUREMENT HEAD, DEPTH DATA COMPUTING DEVICE, AND CORRESPONDING METHOD

(71) Applicant: SHANGHAI PERCIPIO TECHNOLOGY LIMITED, Shanghai (CN)

(72) Inventors: Minjie Wang, Shanghai (CN); Yushi Liang, Shanghai (CN)

(73) Assignee: Nanjing Percipio Technology Limited, Nanjing (CN)

( * ) Notice: Subject to any disclaimer, the term of this patent is extended or adjusted under 35 U.S.C. 154(b) by 322 days.

(21) Appl. No.: 18/284,700

(22) PCT Filed: Dec. 14, 2021

(86) PCT No.: PCT/CN2021/137791

§ 371 (c)(1),
(2) Date: Sep. 28, 2023

(87) PCT Pub. No.: WO2022/222497

PCT Pub. Date: Oct. 27, 2022

(65) Prior Publication Data

US 2024/0169570 A1 May 23, 2024

(30) Foreign Application Priority Data

Apr. 20, 2021 (CN) ......................... 202110423508.2

(51) Int. Cl.

| | |
|---|---|
| ***G01B 11/22*** | (2006.01) |
| ***G01B 11/25*** | (2006.01) |
| ***G06T 7/521*** | (2017.01) |

(52) U.S. Cl.
CPC ............ *G06T 7/521* (2017.01); *G01B 11/254* (2013.01)

(58) Field of Classification Search
None
See application file for complete search history.

(56) References Cited

U.S. PATENT DOCUMENTS

| | | | |
|---|---|---|---|
| 3,682,553 | A | 8/1972 | Kapany |
| 6,542,249 | B1 | 4/2003 | Kofman et al. |

(Continued)

FOREIGN PATENT DOCUMENTS

| | | | |
|---|---|---|---|
| CN | 102621546 | A | 8/2012 |
| CN | 103581625 | A | 2/2014 |

(Continued)

*Primary Examiner* — Amandeep Saini
*Assistant Examiner* — Caroline Tabancay Duffy
(74) *Attorney, Agent, or Firm* — IPro, PLLC

(57) ABSTRACT

A depth data computing device and a corresponding method are provided. The computing device includes a projection device for scanning and projecting a set of structured light with different patterns onto a shooting area, and first and second image sensors for capturing the area to obtain image frames under illumination of the structured light for single depth calculation. Each image sensor includes at least a first sub-image sensor and a second sub-image sensor sharing at least part of an optical path, the sub-image sensors successively imaging the structured light of different patterns projected by the projection device. Continuous imaging is performed using multiple binocular configurations, enabling high-frame-rate depth data acquisition.

21 Claims, 4 Drawing Sheets

(56) References Cited

U.S. PATENT DOCUMENTS

| | | | | |
|---|---|---|---|---|
| 6,549,288 | B1 | 4/2003 | Migdal et al. | |
| 8,320,047 | B2 | 11/2012 | Tocci | |
| 9,204,041 | B1 * | 12/2015 | Campbell | H04N 13/239 |
| 10,902,623 | B1 | 1/2021 | Li et al. | |
| 11,989,896 | B2 | 5/2024 | Schindler et al. | |
| 2004/0125205 | A1 | 7/2004 | Geng | |
| 2004/0246473 | A1 | 12/2004 | Hermary et al. | |
| 2005/0219552 | A1 | 10/2005 | Ackerman et al. | |
| 2007/0211258 | A1 | 9/2007 | Lee et al. | |
| 2009/0195790 | A1 | 8/2009 | Zhu et al. | |
| 2009/0322859 | A1 * | 12/2009 | Shelton | H04N 13/207 348/46 |
| 2010/0008588 | A1 | 1/2010 | Feldkhun et al. | |
| 2010/0079581 | A1 | 4/2010 | Russell et al. | |
| 2011/0037953 | A1 | 2/2011 | Nizani et al. | |
| 2012/0025112 | A1 | 2/2012 | Li et al. | |
| 2012/0314039 | A1 | 12/2012 | You | |
| 2013/0127854 | A1 | 5/2013 | Shpunt et al. | |
| 2013/0155418 | A1 | 6/2013 | Shaw et al. | |
| 2014/0225992 | A1 | 8/2014 | McDowall | |
| 2015/0070472 | A1 | 3/2015 | Chen et al. | |
| 2015/0198800 | A1 * | 7/2015 | Freedman | G06V 40/19 348/46 |
| 2016/0341399 | A1 | 11/2016 | Raz et al. | |
| 2016/0344951 | A1 | 11/2016 | Ko et al. | |
| 2017/0245744 | A1 * | 8/2017 | McDowall | H04N 13/254 |
| 2018/0176544 | A1 | 6/2018 | Wang et al. | |
| 2018/0348368 | A1 | 12/2018 | Bronstein et al. | |
| 2019/0068951 | A1 * | 2/2019 | Mor | G02B 19/0028 |
| 2020/0284883 | A1 | 9/2020 | Ferreira et al. | |
| 2021/0183085 | A1 * | 6/2021 | Pau | G06T 17/00 |
| 2022/0155059 | A1 | 5/2022 | Wang et al. | |
| 2023/0078604 | A1 | 3/2023 | Rein et al. | |

FOREIGN PATENT DOCUMENTS

| | | | | |
|---|---|---|---|---|
| CN | 103780844 | A | * | 5/2014 |
| CN | 103868472 | A | | 6/2014 |
| CN | 104197861 | A | | 12/2014 |
| CN | 204902786 | U | | 12/2015 |
| CN | 107369156 | A | | 11/2017 |
| CN | 108650447 | A | | 10/2018 |
| CN | 109889690 | A | | 6/2019 |
| CN | 110501836 | A | | 11/2019 |
| CN | 209927097 | U | * | 1/2020 |
| CN | 110926369 | A | | 3/2020 |
| CN | 111239729 | A | | 6/2020 |
| CN | 111692987 | A | | 9/2020 |
| CN | 111721238 | A | | 9/2020 |
| CN | 111721239 | A | | 9/2020 |
| CN | 111829449 | A | | 10/2020 |
| CN | 212747701 | U | | 3/2021 |
| CN | 212779131 | U | | 3/2021 |
| CN | 212779132 | U | | 3/2021 |
| JP | H0791927 | A | | 4/1995 |
| JP | H10170239 | A | | 6/1998 |
| JP | H10213423 | A | | 8/1998 |
| JP | 2001108417 | A | | 4/2001 |
| JP | 2003166813 | A | | 6/2003 |
| JP | 2003228125 | A | | 8/2003 |
| JP | 2008224629 | A | * | 9/2008 |
| JP | 2015501938 | A | | 1/2015 |
| JP | 2015102485 | A | | 6/2015 |
| JP | 2020053034 | A | | 4/2020 |
| NL | 2015160 | A | | 7/2016 |
| WO | 2018225517 | A1 | | 12/2018 |
| WO | 2019113445 | A2 | | 6/2019 |
| WO | 2019209064 | A1 | | 10/2019 |
| WO | 2020235348 | A1 | | 11/2020 |

* cited by examiner

FIG. 1A
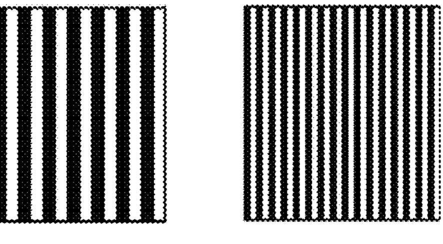
FIG. 1B
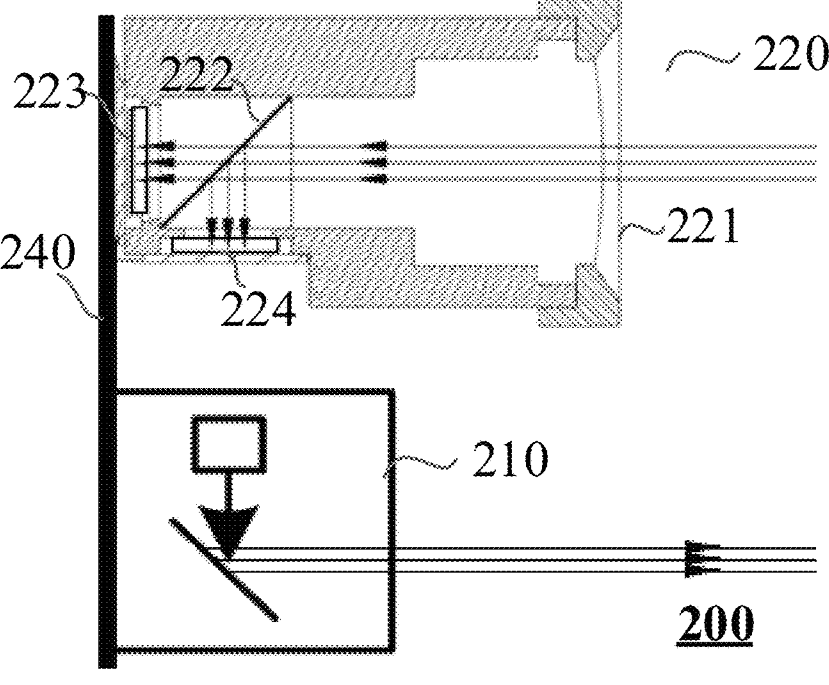
FIG. 2

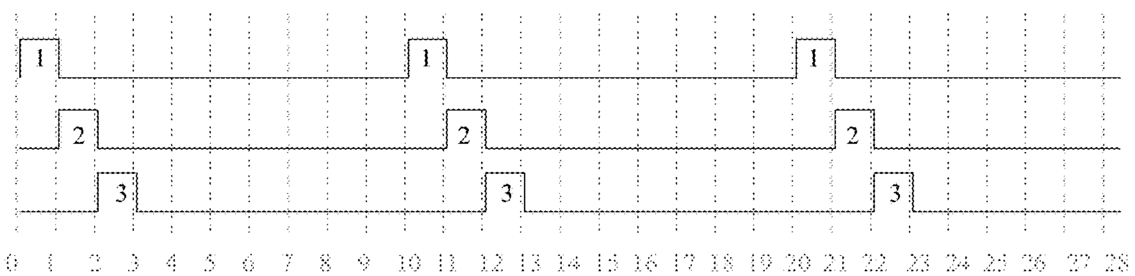
FIG. 5
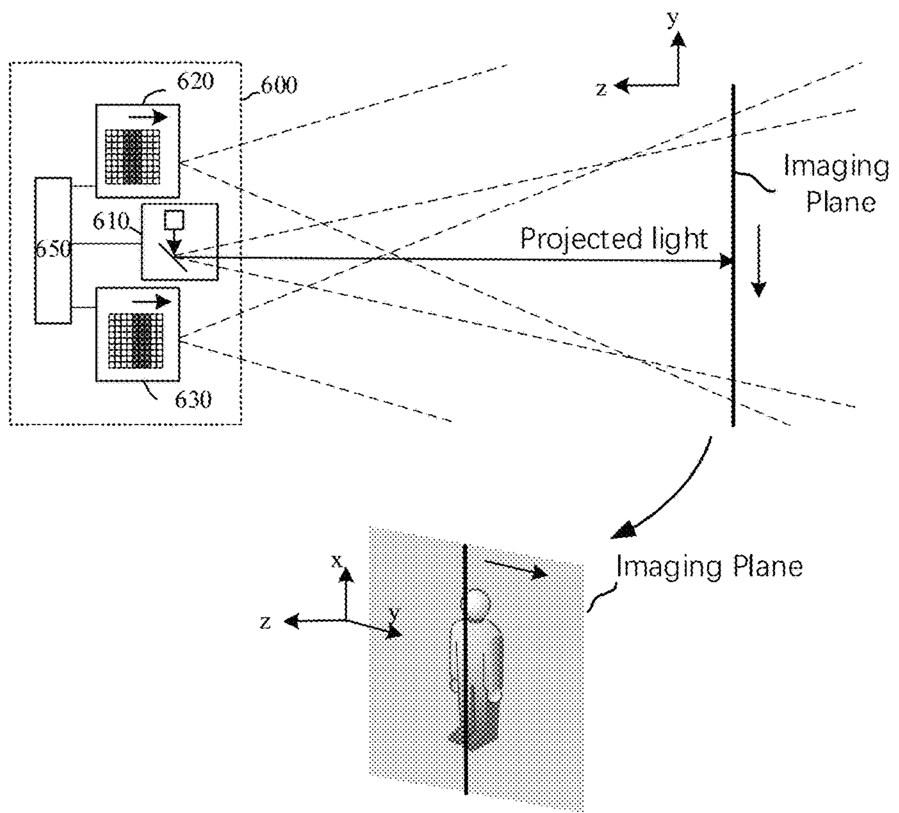
FIG. 6
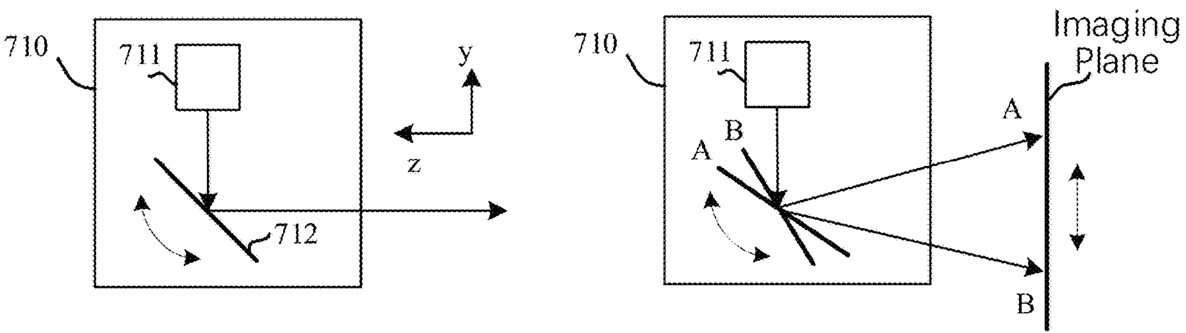
FIG. 7A
FIG. 7B

DEPTH DATA MEASUREMENT HEAD, DEPTH DATA COMPUTING DEVICE, AND CORRESPONDING METHOD

TECHNICAL FIELD

The present disclosure relates to the field of three-dimensional imaging, in particular to a depth data measuring head, a computing device and a corresponding method.

BACKGROUND

A depth camera is a collection device that collects depth information of a target object. This type of camera is widely used in 3D scanning, 3D modeling and other fields. For example, more and more smartphones are now equipped with depth sensors for face recognition. Although 3D imaging has been a research hotspot in the field for many years, the existing depth cameras still have many problems, such as the inability to achieve both measurement accuracy and imaging speed, and the inability to achieve both imaging performance and cost optimization.

For this reason, an improved depth data measuring solution is needed.

SUMMARY

A technical problem to be solved by the present disclosure is to provide a depth data measuring solution, which uses multiple coaxial sub-image sensors for continuous imaging, and can alleviate problems such as the inability to perform dynamic imaging and the low frame rate of depth data caused by the long acquisition time of multiple frames, in the scene where multiple frames are merged to obtain depth data. In addition, since an imaging device with a conventional frame rate is introduced, the use of high-cost and high-frame-rate imaging devices can be avoided while improving depth imaging accuracy and frame rate.

According to a first aspect of the present disclosure, there is provided a depth data measuring head, comprising: a projection device for scanning and projecting a set of structured light having different patterns to a shooting area, and the set of structured lights includes at least two structured lights of different patterns; an image sensor for capturing the shooting area to obtain a set of image frames illuminated by the set of structured light for a single depth data calculation of the shooting area, wherein, the image sensor includes at least two sub-image sensors sharing at least part of an optical path, and the at least two sub-image sensors are respectively used to image the structured light of different patterns sequentially projected by the projection device.

The depth data measuring head described above can be implemented as a monocular solution with a single image sensor. In the preferred binocular structure solution, the image sensor can be the first and second image sensors with a predetermined relative positional relationship, used to capture the shooting area to obtain a set of image frame pairs under the irradiation of a set of structured light for a single depth data calculation of the shooting area, wherein each of the shooting area, wherein each of the first and second image sensors include at least two sub-image sensors that share at least part of an optical path, and the at least two sub-image sensors are respectively used to image the structured light of different patterns sequentially projected by the projection device.

According to a second aspect of the present disclosure, there is provided a depth data computing device, comprising: the depth data measuring head as described in the first aspect; and a processor connected to the depth data measuring head, configured to determine the depth data of the object in the shooting area according to the set of image frames obtained by imaging the structured light.

According to a third aspect of the present disclosure, a method for measuring depth data is provided, comprising: scanning and projecting structured light to a shooting area; capturing the shooting area to obtain a first image frame illuminated by structured light by using a first sub-image sensor; scanning and projecting second structured light of different patterns to the shooting area; and capturing the shooting area to obtain a second image frame under the illumination of the second structured light by using a second sub-image sensor, wherein the first and second sub-image sensors share at least part of an optical path and form an image sensor, the first and second image frames are used for a single depth data calculation of the shooting area.

In the binocular implementation, the method can include: scanning and projecting the structured light to the shooting area; capturing the shooting area to obtain a first image frame pair illuminated by structured light by using a first sub-image sensor pair with a predetermined relative positional relationship; capturing the shooting area to obtain a second image frame pair illuminated by the second structured light by using a second sub-image sensor pair, wherein one sub-image in each of the first and second sub-image sensor pairs share at least part of an optical path and form a first image sensor, and the other sub-image sensors of the first and second sub-image sensor pairs share at least part of an optical path and form a second image sensor, and the first and second image frame pairs is used for a single depth data calculation of the shooting area.

According to a fourth aspect of the present disclosure, there is provided a depth data calculation method, including: acquiring first and second image frames, or first, second and third images according to the depth data measuring method described in the third aspect frame; and according to the predetermined relative position and the first and second image frames, or the first, second and third image frames, determining the depth data of the object to be measured in the shooting area.

Therefore, the present disclosure discloses a solution in which multiple coaxial sub-image sensors sequentially image different patterns and synthesize depth data according to these images. By introducing a coaxial monocular or binocular photosensitive unit, this solution can reduce the imaging time required to merge multiple frames to calculate depth data and increase the frame rate.

BRIEF DESCRIPTION OF FIGURES

The above and other objects, features and advantages of the present disclosure will become more apparent by describing the exemplary embodiments of the present disclosure in more detail with reference to the accompanying drawings, wherein, in the exemplary embodiments of the present disclosure, the same reference numerals generally represent same parts.

FIGS. 1A-B illustrates the principle of depth imaging using stripe-coded structured light.

FIG. 2 shows a schematic composition diagram of a depth data measuring head according to an embodiment of the present disclosure.

FIG. 5 shows a timing diagram of coaxial three-set binocular imaging.

FIG. 6 shows a schematic diagram of column synchronous imaging performed by a depth data measuring head according to an embodiment of the present disclosure.

FIGS. 7A-B illustrate enlarged operation examples of the projection device shown in FIG. 6.

DETAILED DESCRIPTION

Figure 3:
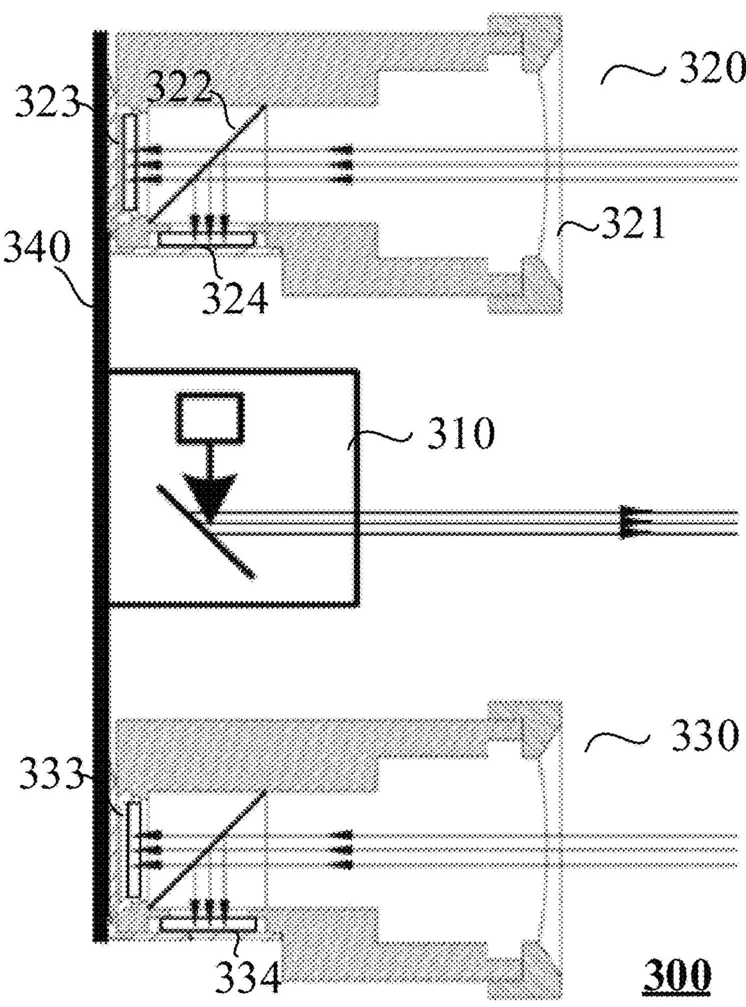
FIG. 3 shows a schematic composition diagram of a depth data measuring head according to an embodiment of the present disclosure.

Preferred embodiments of the present disclosure will be described in more detail below with reference to the accompanying drawings. Although preferred embodiments of the present disclosure are shown in the drawings, it should be understood that the present disclosure can be embodied in various forms and should not be limited to the embodiments set forth herein. Rather, these embodiments are provided so that this disclosure will be thorough and complete, and will fully convey the scope of the disclosure to those skilled in the art.

In order to improve the imaging accuracy and flexibility of depth data, it is possible to combine active projection of multiple images with preferably binocular imaging structures and based on the properties of the superposition of the stripe coding patterns and binocular imaging does not need to depend on a specific imaging plane, to realize highly flexible imaging of pixel-level depth data.

According to the principle of structured light measurement, accurate determination of the scan angle α is the key to the entire measurement system. Point and line-shaped structured light can calculate and determine the scanning angle through mechanical devices such as rotating mirrors, and the significance of image encoding and decoding is to determine the scanning angle of the encoded structured light (i.e., surface structured light) system. FIGS. 1A-B illustrates the principle of depth imaging using stripe-coded structured light. For the convenience of understanding, FIG. 1A briefly illustrates the coding principle of the striped structured light with two gray-level three-bit binary time coding. The projection device can sequentially project three patterns as shown to an object to be measured in the shooting area. The projection space is divided into 8 areas with bright and dark two gray scales in the three patterns. Each area corresponds to a respective projection angle, where it can be assumed that the bright area corresponds to a code "1" and the dark area corresponds to a code "0". Combining the coded values of a point on the scene in the projected space in the three coded patterns according to the projected order, to obtain the area coded value of the point, thereby determining the area where the point is located and decoding to obtain the scan angle of the point.

In a monocular imaging system, depth data calculation can be performed by comparing captured images with reference images. However, in a binocular imaging system, the above decoding process can be simplified by directly matching the encoding values of each point in the first and second image sensors. To improve matching accuracy, the number of projected patterns in the temporal code can be increased. FIG. 1B shows another example of projecting stripe-coded structured light. Specifically, a two gray-level five-bit binary time code is shown. In the application scenario of binocular imaging, this means that for example, each pixel in each left and right image frame contains five 0 or 1 region encoding values, which enables left and right image matching with higher accuracy (e.g., pixel level). It should be understood that, in other embodiments, it is also possible to implement, for example, five-bit quaternary or even octal time coding by using different brightness levels.

Under the condition that the projection rate of the projection device remains unchanged, compared with the three coding patterns in FIG. 1A, the example in FIG. 1B is equivalent to realizing higher-precision image matching at a higher cost in the time domain. Although the original projection rate of the projection device is extremely high (such as the vibrating mirror device preferably used in the present disclosure), due to the limited frame rate of the image sensor, the frame rate of the multi-frame composite depth data is low, and the imaging time required for each frame is too long, making it difficult to capture dynamic videos. For example, in the case of using a conventional image sensor with a frame rate of 60 frames per second, if two-dimensional images taken every five frames (in the binocular implementation, it is actually 5 sets of images, i.e., 10 frame) are used to synthesize a frame of depth image, the frame rate drops to 12 frames per second, and the imaging time for each frame is approximately 83 ms. Such a low frame rate and such a long imaging time are difficult to meet the needs of dynamic imaging. However, if directly increasing the frame rate of the image sensor to achieve a relatively high frame rate of depth data frames, for example, using a high-speed image sensor of 150 frames per second to achieve a frame rate of 30 frames per second of depth data, the cost of equipment will be greatly increased due to the introduction of high-performance components.

In order to meet the requirements of high precision, high frame rate and low cost in the field of three-dimensional imaging, considering that the current projection device can achieve high-speed projection, and the imaging rate of the conventional image sensor itself is relatively high, but the frame rate is reduced due to data transmission and processing, the inventor of the present disclosure proposed a solution in which coaxial multi-set sensor structure is used to image different patterns separately to improve the overall frame rate of depth data based on multiple frames, thus solving the problem of inability to perform dynamic imaging due to the long acquisition time of multiple frames and depth data frame rate is too low and other issues in the prior art. In addition, since an imaging device with a conventional frame rate is introduced, the use of high-cost and high-frame-rate imaging devices can be avoided while improving depth imaging accuracy and frame rate.

Specifically, the present disclosure discloses a depth data measuring head, comprising: a projection device for scanning and projecting a set of structured light having different patterns to a shooting area, and the set of structured lights includes at least two structured lights of different patterns; an image sensor for capturing the shooting area to obtain a set of image frames illuminated by the set of structured light for a single depth data calculation of the shooting area. In other words, the image sensor needs to image each pattern in a set of structured light, and captures images with different patterns for synthesizing one depth data. The image sensor of present disclosure includes at least two sub-image sensors sharing at least part of an optical path, and the at least two sub-image sensors are respectively used to image the structured light of different patterns sequentially projected by the projection device.

Here, the sub-image sensors included in the image sensor that share at least part of the optical path can be used to image successively projected patterns in a set of structured light projected by the projection device in turn until all patterns in a set of structured light are imaged. For example, the projection device projects a set of three structured lights, such as shown in FIG. 1, and the image sensor includes two sub-image sensors. In this situation, the first sub-image sensor images the first pattern, the second sub-image sensor images the second pattern, and the first sub-image sensor then images the third pattern. In other words, when the number of patterns included in a set of structured light is not greater than the number of sub-image sensors included in the image sensor, different images of the images can be imaged by different sub-image sensors included in the image sensor. However, when the number of patterns contained in a set of structured light is greater than the number of sub-image sensors contained in the image sensor, the number of sub-image sensors contained in the image sensor needs to perform a second imaging, that is, the same sub-image sensor at different times images different patterns.

In some embodiments, the projected pattern can be a speckle pattern, for example, the same diffraction pattern projected at different angles and imaged at different angles can be regarded as different patterns.

However, in a preferred embodiment of the present disclosure, the projected pattern can be a striped light pattern as shown in FIGS. 1A-B. Compared with spatially modulated speckle patterns, stripe light pattern imaging can be regarded as a time modulation scheme, that is, different stripes projected at different times are used to synthesize a depth data map, which has a sufficiently high QE (quantum efficiency). It can fully charge the exposed pixels of the image sensor in microseconds. For this reason, a depth measuring device with a high anti-interference coefficient can be realized especially in combination with a rolling shutter image sensor.

In some embodiments, the image sensor can be a single image sensor, i.e., implemented as a monocular system. In other embodiments, the image sensor can be two image sensors, that is, implemented as a binocular system. The monocular and binocular implementations based on the principle of the present disclosure will be described respectively below with reference to FIG. 2 and FIG. 3.

FIG. 2 shows a schematic composition diagram of a depth data measuring head according to an embodiment of the present disclosure. As shown, the depth data measuring head 200 based on the monocular principle includes a projection device 210 and an image sensor 220. Although not shown in the figure for convenience of illustration, the measuring head 200 can also include a housing for surrounding the above-mentioned devices, and the connection structure 240 shown in FIG. 2 can be regarded as a mechanism for fixing the above-mentioned devices and connecting to the housing. In some embodiments, connection structure 240 can be a circuit board including control circuitry thereon. It should be understood that, in other implementations, the aforementioned devices 210 and 220 can be connected to the housing in other ways, and perform corresponding data transmission and command reception operations.

Here, the projection device 210 is used to scan and project a set of structured lights of different patterns to the shooting area, and the set of structured lights includes at least two structured lights of different patterns. The image sensor 220 is used to capture the shooting area to obtain a set of image frames illuminated by the set of structured light for a single depth data calculation of the shooting area.

For example, the projection device 210 sequentially projects three patterns as shown in FIG. 1. The three patterns are taken as a set, and the image sensor images each of the patterns, thereby obtaining a set of image frames including 3 frames. According to the principle of monocular imaging, these three frames of images can be compared with their corresponding reference image frames, and used together for one depth data calculation of the shooting area, that is, a depth image of one frame can be calculated.

Unlike the image sensor in the conventional measuring head, which only includes one photosensitive unit, and each photosensitive unit performs three imaging to obtain image frames in sets of 3 frames, in the present disclosure, the image sensor 220 includes at least two sub-image sensors that share at least part of an optical path, the at least two sub-image sensors are respectively used to image the structured light of different patterns successively projected by the projection device.

FIG. 2 shows an example in which the image sensor 220 includes two sub-image sensors (photosensitive units). As shown, the image sensor 220 includes sub-image sensors 223 and 224. Among them, the sub-image sensors 223 and 224 share an optical path until the beam splitting surface of the beam splitting device 222, and the distances from the above beam splitting area are equal, or at least approximately equal. In other words, the present disclosure introduces sensor structures that are coaxial with each other. Here, the sub-image sensor 223 can be used to image, for example, the structured light of the first pattern among the three patterns in FIG. 1. Subsequently, the sub-image sensor 224 can be used to image, for example, the structured light of the second of the three patterns in FIG. 1. In other words, in this situation, it can be considered that the sub-image sensor 224 with the same optical path (or a completely equivalent optical path) is in place, replacing the sub-image sensor 223 to perform imaging of the latter pattern structured light. Thus, the imaging interval of two adjacent frames can be imaged at a smaller interval without depending on the frame interval of each image sensor.

Similarly, FIG. 3 shows a schematic composition diagram of a depth data measuring head according to an embodiment of the present disclosure. An example of the composition of the image sensor is given in more detail in the figure compared to the schematically shown projection device.

As shown in FIG. 3, the depth data measuring head 300 based on the binocular principle includes a projection device 310 and a first image sensor 320 and a second image sensor 330 having a predetermined relative positional relationship. Although not shown in the figure for convenience of illustration, the measuring head 300 can also include a housing for surrounding the above-mentioned devices, and the connection structure 340 shown in FIG. 3 can be regarded as a mechanism for fixing the above-mentioned devices and connecting to the housing. In some embodiments, connection structure 340 can be a circuit board including control circuitry thereon. It should be understood that, in other implementations, the above-mentioned devices 310-330 can be connected to the housing in other ways, and perform corresponding data transmission and command reception operations.

Here, the projection device 310 is configured to scan and project a set of structured lights of different patterns to the shooting area, and the set of structured lights includes at least two structured lights of different patterns. The first image sensor 320 and the second image sensor 330 having a predetermined relative positional relationship are used to capture the shooting area to obtain a set of image frame pairs illuminated by the set of structured light for use in a single depth data calculation of the shooting area.

For example, the projection device 310 sequentially projects three patterns as shown in FIG. 1. The three patterns are taken as a set, and the image sensor images each of the patterns, thereby obtaining a set of image frame pairs including three pairs (6 frames). These 6 frames of images are jointly used for one depth data calculation of the shooting area, that is, a depth image of one frame can be calculated.

Different from the conventional binocular measuring head in which the first image sensor 320 and the second image sensor 330 each include only one photosensitive unit, and each photosensitive unit performs three imaging to obtain a set of three pairs (6 frames) of image frames, in the present disclosure, each of the first and second image sensors includes at least two sub-image sensors that share at least part of an optical path, and the at least two sub-image sensors are respectively used for the structured light of different patterns successively projected by the projection device for imaging.

FIG. 3 shows an example in which the first and second image sensors each include two sub-image sensors (photosensitive units). As shown, the first image sensor 320 includes sub-image sensors 323 and 324, and the second image sensor 330 includes sub-image sensors 333 and 334. Among them, the sub-image sensors 323 and 324 share an optical path until the beam splitting surface of the beam splitting device 322, and are at the same distance from the aforementioned beam splitting area. Likewise, the sub-image sensors 333 and 334 share an optical path until the beam splitting surface of the beam splitting device 332, and are at equal distances from the aforementioned beam splitting area. In other words, the present disclosure introduces sets of binocular structures coaxial with each other. Here, the sub-image sensors 323 and 333 belonging to different image sensors can be regarded as the first set of image sensors (the first set of binoculars), which are used to compare the first pattern among the three patterns in FIG. 1 structured light imaging. Subsequently, the sub-image sensors 324 and 334, considered as a second set of image sensors (second set of binoculars), can be used to image structured light such as the first of the three patterns in FIG. 1. In other words, in this situation, it can be regarded that the sub-image sensors 324 and 334 coaxial with 323 and 333 respectively are in place, replacing the sub-image sensors 323 and 333 to perform imaging of the latter pattern structured light. Thus, the imaging interval of two adjacent frames can be imaged at a smaller interval without depending on the frame interval of each image sensor.

Thus, the measuring head 200 or 300 can also include: a synchronization device for making the at least two sub-image sensors included in image sensor 220 or each included in the first and second image sensors 320 and 330 to sequentially image the structured light of at least two different patterns at a first interval which is smaller than the frame imaging interval of the sub-image sensor, while the projection device is projecting the at least two different patterns of structured light at the first interval. Correspondingly, each sub-image sensor still performs its next frame imaging at a second interval not smaller than the frame imaging interval of the sub-image sensor (for example, imaging at its own frame interval), and the above-mentioned imaging operations can be synchronized with the projection of the projection device by the synchronization device.

Figure 4:
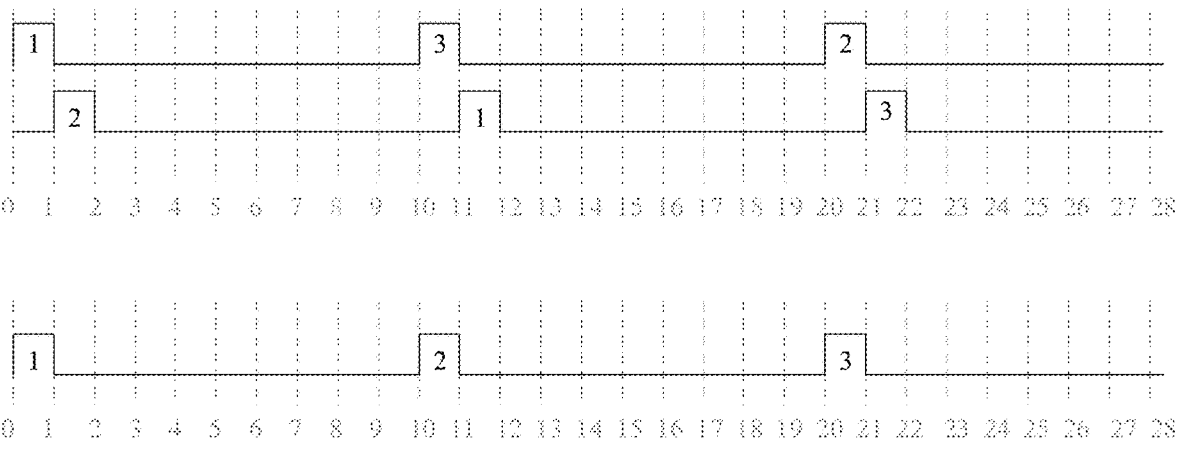
FIG. 4 shows a comparison timing diagram of two sets of coaxial binocular imaging and a single set of binocular imaging.

FIG. 4 shows a comparison timing diagram of coaxial two-set imaging and single-set imaging. Here, for the convenience of explanation, the frame rate of each photosensitive unit (sub-image sensor) can be set to 100 frames/s, then the frame interval is 10 ms, and the exposure time required by each photosensitive unit can be set to 1 ms.

If the image sensor 220 or the first and second image sensors 320 and 330 are conventional image sensors comprising only a single photosensitive unit, when the three patterns shown in FIG. 1 are to be used for depth data calculation, as shown in the lower part of FIG. 4, imaging needs to be performed three times at the 0th, 10th and 20th ms. Therefore, compositing each depth data image requires the object to remain still for 21 ms (thus making it harder to capture objects in motion), and the frame rate drops from 100 frames/s to 33.3 frames/s.

In contrast, if image sensor 220 or first and second image sensors 320 and 330 are composed of two photosensitive units (for example, image sensor 220 includes sub-image sensors 223 and 224, first and second image sensors 320 and 330 each includes sub-image sensors 323 and 324, and sub-image sensors 333 and 334) of the image sensor of the present disclosure, when the three patterns shown in FIG. 1 are used for depth data calculation, as shown in the upper part of FIG. 4, the first set of photosensitive units performs imaging for pattern 1 at 0 ms, and then the second set of photosensitive units performs imaging for pattern 2 at 1 ms, and then after an interval of 10 ms, the first set of photosensitive units performs imaging for pattern 3 at 10 ms, thus completing the three imaging required for one depth data image. Subsequently, at 11 ms, the second set of photosensitive units can start the next round of imaging for pattern 1. At 20 ms, the first set of photosensitive units performs imaging for pattern 2. At 21 ms, the second set of photosensitive units performs imaging for the pattern 3 again. In this way, the imaging interval of different sets of photosensitive units only needs to be separated by the time required for imaging (for example, 1 ms), and the re-imaging interval of the same set of photosensitive units still follows the frame interval corresponding to the frame rate (for example, 10 ms). In this situation, by introducing two sets of coaxial binoculars, compositing each depth data image only requires the object to remain still for 11 ms (thus making it easier to capture objects in motion), and the frame rate can be maintained at close to 66.6 frames/s.

Although an example with two sets of coaxial (coaxial) photosensitive units is described in conjunction with FIGS. 2-4, in other embodiments, each of the first and second image sensors can further include more photosensitive units. FIG. 5 shows a timing diagram of coaxial three-set binocular imaging. In this situation, each of the first and second image sensors can include three coaxial photosensitive units (sub-image sensors). Thus, as shown in FIG. 5, the first set of photosensitive units performs imaging for pattern 1 at 0 ms, and then the second set of photosensitive units performs imaging for pattern 2 at 1 ms, and then the third set of photosensitive units performs imaging for pattern 3 at 2 ms. Subsequently, the next round of three sets of imaging starts at 10 ms, the next round of three sets of imaging starts at 20 ms, and so on. In this situation, by introducing three sets of coaxial binoculars, it only takes 3 ms to obtain three sets (6 frames) of images required to synthesize a depth data image, that is, the object only needs to remain still for 3 ms, therefore, the ability to shoot moving objects is greatly improved, and the frame rate can be kept close to 100 frames/s (in this example, it takes 1003 ms to shoot 100 frames, or 1.003 s).

Thus, it should be understood that simply by introducing an additional set of coaxial binocular structures (or monocular structures), the frame rate of depth data based on multi-frame synthesis can be doubled and the imaging time of each frame can be shortened. Theoretically, a coaxial binocular structure with the same number of sets of images projected by the projection device can be arranged, so that the framing time of each depth frame and the frame interval of the sensor are only related to the multiple of the exposure time (if the frame interval is greater than the exposure time x number of coaxial structure sets). For example, in the case of synthesizing depth frames based on four patterns, if two sets of coaxial binoculars are used as shown in FIG. 3, the imaging time for acquiring four frames increases slightly to 12 ms, but the frame rate drops to nearly 50 frames/s. But if four sets of coaxial binoculars are used, the imaging time for acquiring four frames is only 4 ms, and the frame rate remains close to 100 frames/s. However, introducing too many coaxial structures will increase the difficulty of constructing the image sensor, and it is necessary to make a compromise between cost, feasibility and imaging speed.

In order to realize the coaxial configuration of different photosensitive units in the same image sensor, it is necessary to design the optical path. In the example in FIG. 3, a coaxial arrangement based on beam splitting is shown (the example in FIG. 2 also has a similar structure). In this situation, taking the first image sensor 320 as an example, it can include: lens assembly 321 for receiving the incident return structured light; a beam splitting device 322 for dividing the incident return structured light into at least a first light beam and a second light beam; the first sub-image sensor 323 for imaging the first light beam; the second sub-image sensor 324 for imaging the second light beam corresponding to the returned structured light of different patterns.

In one embodiment, the beam splitting device 322 is an optical prism, such as a square prism or a triangular prism. Thus, the reflected infrared light in the incident light reaches the second sub-image sensor 324, and the visible light that is not reflected in the incident light can travel straight to the first sub-image sensor 323.

As shown, the beam splitting device 322 in the form of a prism can split the incident light into two beams whose propagation directions are perpendicular to each other. Correspondingly, the first sub-image sensor 323 and the second sub-image sensor 324 can also be arranged vertically, so as to respectively receive the incident visible light and infrared light beams at a vertical angle.

To eliminate parallax and achieve pixel-level alignment, components in the incident light need to have the same optical path. For this, in the case of using a quadrangular prism as the beam splitting device 322, the first sub image sensor 323 and the second sub image sensor 324 can be arranged at an equal distance from the beam splitting area of the beam splitting device 322. In the case of using a prism as the beam splitting device 322, the distance between the two photosensitive units and the beam splitting device 322, especially the beam splitting area, can be flexibly adjusted according to the ratio of the refractive index of the air to the prism material.

Pixel-level alignment (or approximate alignment) between the first sub-image sensor 323 and the second sub-image sensor 324 can be theoretically achieved by making incident light share most of the optical path and have the same optical path length. However, in the actual manufacturing process of the image sensor, because the actual arrangement of the first sub-image sensor 323 and the second sub-image sensor 324 cannot present ideal vertical and equidistant conditions, there will be a deviation between the imaging of the two. In this situation, forced software correction can be performed on the fabricated image sensor. For example, by introducing a calibration target and aligning the images of the first sub-image sensor 323 and the second sub-image sensor 324 with the calibration target, real pixel-level correction can be realized.

As shown, the image sensor 320 of the present disclosure can be implemented as a separate module. Thus, the image sensor 320 can further include a housing for fixing the relative positions of lens assembly, the beam splitting device, and the two photosensitive units. Preferably, the housing can be combined with lens assembly 321 to form a sealed body, so as to avoid contamination of the contained components by the external environment. In other embodiments, the image sensor 320 of the present disclosure can be part of a larger module (e.g., a depth data measuring head), and the housing of the larger module realizes the fixing between the various components.

Preferably, the image sensor 320 can further include cables connected to the first sub-image sensor 323 and the second sub-image sensor 324 respectively. The housing then has openings for cable entry. In one embodiment, the cable can be a flexible cable, such as an FPC (flexible printed circuit) wire.

In one embodiment, before the light beam enters the first sub-image sensor 323 and the second sub-image sensor 324, it can also pass through a filter to further filter out the influence of light of other wavelengths. In one embodiment, the projection device can project infrared laser light, so the optical filter arranged in the image sensor can be a corresponding infrared light transmission unit, which is used to transmit infrared light in a specific frequency range, for example, the wavelength used in the present disclosure is 780-1100 nm infrared light. In other embodiments, the projection device can also project visible light, such as projecting red laser light or blue laser light, such as 635 nm red light or 450 nm blue light. For example, compared with 830 nm infrared light whose QE is only 20%, the QE of 635 nm red light is as high as 90%~95%. Although the ambient light can also include red light or blue light, due to the short exposure time and the strong instantaneous laser light, it is also possible to perform imaging with a high signal-to-noise ratio with the help of the corresponding filter that transmits red light or blue light. In case the projection device projects visible light, for example red light, the first and second sub-image sensors can also be realized as corresponding visible light sensors.

Preferably, when the beam splitting device is a square prism, one side of the filter can be in direct physical contact with the square prism, and the other side is in physical contact with the photosensitive unit, while the photosensitive unit and the square prism are clamped in the housing, this ensures a high degree of invariance in the relative position of the individual components.

In some embodiments, especially in the case where the first and second sub-image sensors are infrared light sensors for receiving projected infrared patterns, an additional visible light sensing unit (not shown in the figure) can also be arranged in the image sensor, and is used to capture the image information of the object to be measured, so that the image captured by the image sensor contains both the image information and the depth information of the object to be measured. The visible light sensing unit can be a grayscale sensor or a color sensor. Among them, the grayscale sensor only captures brightness information, and the color sensor can be used to capture the color information the object to be measured. For this, the visible light sensing unit can be composed of three primary color sensing units, where the three primary colors can be red, green and blue (RGB) or cyan, red and yellow (CMY).

It should be understood that although the structure of the first image sensor 320 is specifically described based on FIG. 3, the second image sensor 330 can also have the same structure. In addition, it should be understood that 323 and 333 can be regarded as the first set of binoculars, 324 and 334 can be regarded as the second set of binoculars, but as long as the imaging is turned on after the corresponding pattern is incident, 323 and 334 can also be regarded as the first set of binoculars, while 324 and 333 can be regarded as the second set of binoculars.

In the case of using beam splitting to share the light path as shown in FIG. 3, since the light acquired by each photosensitive unit will decrease, the sensitivity or effectiveness distance range of the imaging can be ensured by increasing the projected brightness or expanding the incident aperture.

Therefore, as an alternative, optical path sharing can also be implemented based on optical path switching. For this, the image sensor 220 or the first and second image sensors 320 and 330 can each include: lens assembly for receiving the incident return structured light; an optical path conversion device for transporting the incident return structured light to at least a first sub-path and a second sub-path; the first sub-image sensor for imaging the return structured light on the first sub-path; the second sub-image sensor for imaging the return structured light corresponding to different patterns on the second sub-path. In one embodiment, the optical path conversion device can be a rotating mirror, which can reflect the incident light to the photosensitive unit 323 at the 0th ms, reflect the incident light to the photosensitive unit 324 at the 1st ms, and so on. In other embodiments, the optical path conversion device can also be a device that performs optical path conversion based on other mechanical, chemical or electrical principles.

As mentioned above, the set of structured light with different patterns projected by the projection device 310 can be a set of structured light with different coded stripes, such as the pattern in FIG. 1 or FIG. 2. In some cases, the projection device 310 can be a projection device that projects a complete pattern at a time, and in other cases, the projection device 310 can be a device that completes the pattern by light and dark scanning of line-shaped light or two-dimensional scanning of light spots.

Therefore, the projection device 310 can include: a laser generator for generating line-shaped and/or point laser light, and the laser generator performs high-speed switching to scan and project alternate light and dark structured light corresponding to the stripe code. More specifically, the projection device includes: a light emitting device for generating line-shaped light, and the laser generator can be included in the light emitting device; and a reflecting device for reflecting the line-shaped light to project the line-shaped light moving in a direction perpendicular to the stripe direction to the shooting area. In the module 310 of FIG. 3, the light emitting device is shown by a rectangle, and the reflecting device is shown by a diagonal line. The reflecting device can include one of the following: a mechanical vibrating mirror reciprocating at a predetermined frequency, for scanning and projecting the line-shaped light to the shooting area at the predetermined frequency, wherein the length direction of the line-shaped light is the length direction of the projected stripes; and a micromirror device reciprocating at a predetermined frequency for scanning and projecting the line-shaped light to the shooting area at the predetermined frequency, wherein the length direction of the line-shaped light is the length direction of the projected stripes.

In the case of scanning projection by the projection device, although the image sensor can be a global image sensor (i.e., all pixels are imaged simultaneously), it is preferably implemented as a rolling screen image sensor. Thus, the measuring head 300 can further include: a column synchronization device, for synchronously enabling the pixel column in the stripe direction corresponding to the current scanning position in the sub-image sensor currently used for imaging to perform imaging based on the scanning position of the projection device.

In a preferred embodiment, since the rolling shutter image sensor usually can only perform unidirectional column exposure, for example, exposure from the first row to the 1000th row, but not vice versa. For example, when the two sub-image sensors need to perform imaging successively, assuming that the projection device performs line-shaped light projection from left to right within 1 ms, for example, projecting the fourth pattern in FIG. 1B, the first sub-image sensor also performs column exposure from left to right, correspondingly. The first sub-image sensor also performs column exposure from left to right. If both sub image sensors are installed in the same way, the projection device needs to return to the initial projection position on the left after projecting the fourth pattern, and then project the fifth image in FIG. 1B. Correspondingly, the second sub-image sensor also does a left-to-right column exposure. Therefore, the two sub-image sensors installed in one image sensor of the present disclosure can be rolling shutter image sensors installed upside down to each other, thereby realizing column exposure opposite to each other, so that the vibrating mirror does not need to return to a certain fixed position to start the projection of a new pattern, but both sides of the reciprocating motion can start the projection of a new pattern.

For example, the movement of the vibrating mirror from left to right can scan and project of a stripe pattern, and the first sub-image sensor can perform column exposure from left to right, correspondingly. After completing the projection of a stripe pattern, the vibrating mirror does not need to return to the left, but can directly scan and project the second stripe pattern from right to left. In this situation, since the second sub-image sensor is arranged upside down relative to the first sub-image sensor, so that the second sub-image sensor can perform column exposure from right to left. It should also be understood that the projection device of the measuring head of the present disclosure can have a structure other than that shown in FIG. 3, such as a grating printed with a fixed pattern.

In addition, when using a rolling shutter image sensor for imaging, a multi-mode imaging mechanism can also be introduced. For example, in the high exposure column, increase the imaging brightness range and lower the brightness precision, and in the low exposure column, lower the imaging brightness range and increase the brightness precision.

FIG. 6 shows a schematic diagram of column synchronous imaging performed by a depth data measuring head according to an embodiment of the present disclosure. As shown, the depth data measuring head 600 includes a projection device 610 and two image sensors 620 and 630.

The projection device 610 is used for scanning and projecting structured light with stripe codes to the shooting area. For example, within three consecutive image frame projection periods, the projection device 610 can successively project three patterns as shown in FIG. 1, and the imaging results of these three patterns can be used to generate depth data. 620 and 630, which can be referred to as the first and second image sensors respectively, have a predetermined relative positional relationship and are used to capture the shooting area to respectively obtain first and second two-dimensional image frames illuminated by structured light. For example, in the case that the projection device 610 projects three patterns as shown in FIG. 1, the first and second image sensors 620 and 630 can respectively image the photographed areas (for example, the imaging plane in FIG. 3 and the area within a certain range before and after it) on which the three patterns are projected within three synchronized image frame imaging periods. The three imaging uses different sets of photoreceptor units respectively.

As shown in FIG. 6, the projection device 610 can project line-shaped light extending in the x direction in the z direction (i.e., toward the shooting area). In different embodiments, the above-mentioned projected line-shaped light can be already shaped (that is, the outgoing light itself is the line-shaped light), or it can be a light spot moving in the x direction (that is, the line-shaped light obtained by scanning light). The projected line light can be continuously moved in the y direction to cover the entire imaging area. The perspective view of the shoot area shown in the lower part of FIG. 6 gives a more comprehensible illustration of the scanning of the line light.

In the embodiment of the present disclosure, the direction in which the light exits the measuring head is designated as the z direction, the vertical direction of the shooting plane is referred to as the x direction, and the horizontal direction as the y direction. Therefore, the striped structured light projected by the projection device can be the result of the line-shaped light extending in the x direction moving in the y direction. Although in other embodiments, synchronization and imaging processing can also be performed on the striped structured light obtained by moving the line-shaped light extending in the horizontal y direction in the x direction, however, in the embodiment of the present invention, it is still preferred to use vertical stripes of light for illustration.

Further, the measuring head 600 also includes a column synchronization device 650. The column synchronization device 650 is respectively connected with the projection device 610 and the first and second image sensors 620 and 630 to achieve precise synchronization among the three. Specifically, based on the scanning position of the projection device 610, the column synchronization device 650 can synchronously turn on the pixel columns in the stripe direction corresponding to the current scanning position in the corresponding set of photosensitive units of the first and second image sensors 620 and 630 for imaging. As shown in FIG. 3, the current stripe is scanning to the center area of the shooting area. For this, in a corresponding set of photosensitive units of the image sensors 620 and 630, the pixel columns (for example, three adjacent pixel columns) located in the central area are turned on for imaging. As the stripe moves in the y direction (shown by the arrow in the perspective view shown in the lower part of FIG. 3), the pixel columns turned on for imaging in the corresponding set of photosensitive units of the image sensors 620 and 630 are also synchronized moving accordingly (shown by the arrow above the matrix shown in the upper left box diagram of FIG. 3). In this way, the one-dimensional characteristic of the stripe image can be used to control the range of the pixel column for imaging at each moment, thereby reducing the adverse influence of ambient light on the measurement result. In order to further reduce the influence of ambient light, the projection device is especially suitable for projecting light that is not easily confused with ambient light, such as infrared light. In addition, since the corresponding relationship between pixel columns and scanning light is affected by many factors such as the width, power, speed, and photosensitive efficiency of the image sensor of the projected light, the range of pixel columns (and the corresponding number) that are turned on each time can be based on, for example, a calibration operation to determine.

FIGS. 7A-B illustrate enlarged operation examples of the projection device shown in FIG. 6. Specifically, as shown in FIG. 6, in the projection device 610, the laser light emitted by a laser generator (such as the laser generator 711 shown in detail in FIGS. 7A-B) is scanned and projected to the shooting area (gray area in F FIG. 6) through a projection mechanism (projection mechanism 712 shown in detail in FIGS. 7A-B), so as to perform active structured light projection on the object to be measured (for example, the person in FIG. 6) in the shooting area. A pair of image sensors 620 and 630 images the shooting area, thereby acquiring image frames required for depth data calculation. As shown in FIG. 3, the dotted lines emitted by the projection device 610 are used to represent its projection range, while the dotted lines emitted by the image sensors 620 and 630 are used to represent their respective imaging ranges. The shooting area is usually located in the overlapping area of the respective projection and imaging ranges of the three.

In practical applications, the laser generator is used to generate linear and/or infrared laser light, and the laser generator performs high-speed switching to scan and project light and dark structured light corresponding to the stripe code. High-speed switching can include high-speed switching of laser generators and high-speed code switching.

In one embodiment, the laser generator can continuously emit laser light with the same intensity, and the projected stripe pattern is realized by turning on and off the laser generator. In this case, since the laser generator only projects light of one intensity, each pixel of the image sensor only needs to record the "presence" of light, so the equipped image sensor can be a black and white image sensor.

In another embodiment, the laser generator itself can emit laser light with varying light intensity, for example, laser light with sinusoidal light intensity change according to the applied power. The sinusoidally transformed laser light described above can be combined with stripe projection, whereby a pattern of alternating light and dark with varying brightness between the bright stripes can be scanned and projected. In this case, the image sensor needs to have the capability of imaging different light intensities, so it can be a multi-level grayscale image sensor. Clearly, grayscale projection and imaging can provide more precise pixel-to-pixel matching than black-and-white projection and imaging, thereby improving the accuracy of depth data measurements.

In one embodiment, the laser generator 711 can be a line-shaped laser generator that generates a line of light extending in the x direction (a direction perpendicular to the paper in FIGS. 7A-B). The line-shaped light is then projected onto the imaging plane by a reflective mechanism 712 that can oscillate along an axis in the x-direction. The swinging range of the reflection mechanism 712 is shown in FIG. 7B. As a result, reciprocating line-shaped light scanning can be performed within the range AB of the imaging plane.

Figure 8:
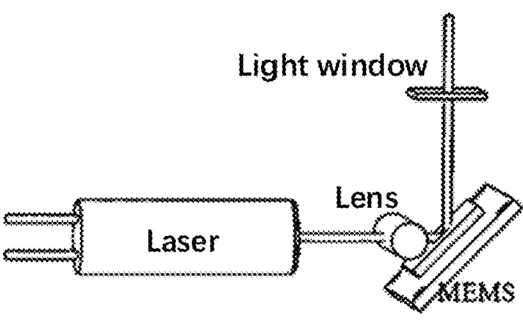
FIG. 8 shows a simplified perspective schematic diagram of a projection device used in the present disclosure.

In one embodiment, the above-mentioned reflection mechanism 712 can be a micromirror device (also referred to as a digital micromirror device, DMD), and can be implemented as a MEMS (Micro Electro Mechanical System). FIG. 8 shows a simplified perspective schematic diagram of the projection device used in the present disclosure. As shown in FIG. 8, line-shaped light can be obtained from the point laser light generated by the laser through the lens (corresponding to the line-shaped laser generator 711 in FIG. 7), and the above-mentioned line-shaped light is reflected by a micromirror device in the form of MEMS, and the reflected line-shaped light is then projected to the external space through a light window. Micromirror devices have extremely high performance. For example, commercially available MEMS can perform highly stable reciprocating vibrations at a frequency of 2 k, thus laying the foundation for high-performance depth imaging.

In other embodiments, the laser beam scanned and projected can also be a point laser, so the projection mechanism needs to change the projection direction in two-dimensional directions (xy directions in the figure) accordingly. For example, the projection mechanism first scans the line-shaped light in the x direction, and then performs displacement in the y direction, and continues scanning in the x direction at different y positions.

Figure 9:
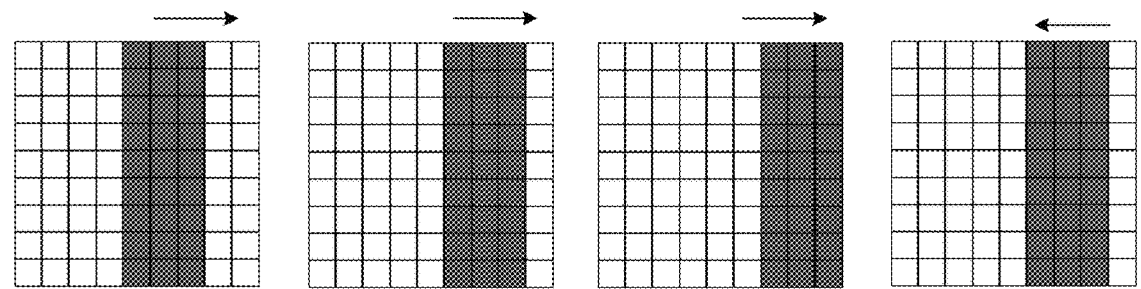
FIG. 9 shows a schematic diagram of turning on pixel columns in an image sensor in turn.

Whether it is directly projecting a striped light that moves in the y direction, or projecting a point light that needs to move in the x direction to form a stripe and then shift in the y direction, what it presents on the shooting area is a stripe that moves in the y direction over time. As the light spot moves in the y direction, specific column(s) of pixels among all the pixels on the image sensor used to record the image frame is turned on, so that it can collect light reflected back from the corresponding position. FIG. 9 shows a schematic diagram of turning on pixel columns in an image sensor in turn. As shown in FIG. 9, when the stripes projected by the projection device move from the middle of the imaging area to one side, in the pixel array of the image sensor, the pixel columns turned on for imaging also move from the middle to one side. As a result, the pixel row is only imaged and recorded during the period of time when the corresponding shooting area is scanned, and is not recorded during other times. Since the intensity of the projected laser light is higher than that of the ambient light, the structured light itself can be imaged very accurately when the ambient light cannot be accumulated under the synchronous opening scheme of the present disclosure. Since conventional image sensors usually perform row exposure, the image sensor used in the present disclosure for column-by-column (or multi-column simultaneous) exposure can be obtained by transposing the existing image sensor by 90°. After the transposition, control of the simultaneous exposure of the entire column needs to be added.

It should be understood that the pixel matrix shown in FIG. 6 and FIG. 9 is only an example given to illustrate the synchronization principle of the present disclosure. In practical applications, the pixel matrix of an image sensor often has a higher order of magnitude (for example, 1000×1000), and the pixel columns that are turned on at the same time each time can also have different ranges according to the calibration (for example, 3 columns are turned on each time, or turn on different columns at different positions for the shooting area, etc.). In addition, the turning on of the pixel column in the image sensor can only be related to the scanning position of the projection structure in the projection device, and has nothing to do with whether the stripe light is actually projected currently. In other words, the turning off and on of the laser emitter based on the distribution of the light and dark stripes of the projection structure will not affect the scanning and projection action of the projection structure, nor will it affect the activation of the image sensor pixel columns synchronously with the above scanning and projection action.

The above projection device can include a vibrating mirror reciprocating at a predetermined frequency, such as a MEMS vibrating mirror or a mechanical vibrating mirror, for scanning and projecting a linear laser beam to the shooting area at a predetermined frequency. Since the vibrating mirror can achieve extremely high vibration frequencies, for example, 2 k per second, which is equivalent to sweeping out a complete projected structured light in 250 μs, extremely precise synchronization of the reflected light position is required. The above accuracy makes it impossible to directly use the startup signal of the MEMS vibrating mirror for synchronization (because the delay is unreliable). Therefore, considering the characteristics of the phase vibration of the micromirror device, a measuring device for real-time measurement of the vibration phase of the vibrating mirror can be included in the synchronization device, and based on the measurement result of the measuring device, the pixel column imaging is started synchronously. This ensures synchronization of scanning and imaging at very high frequencies. In the multi-coaxial binocular implementation of the present invention, the vibrating mirror can be required to sweep out a complete projected structured light within one millisecond.

In one embodiment, the above measurements can be based on the outgoing light itself. Therefore, the above-mentioned measuring device can be one or more photosensors (for example, two photodiodes PD), and the two photosensors are arranged in any of the following ways: arranged on different emission paths of the projection device; arranged on different reflection paths within the projection device; and on outgoing and reflection paths respectively arranged inside and outside the projection device. The layout of the photosensors can be reasonably selected so that it does not affect the normal projection of the structured light while accurately measuring the phase. As shown in FIG. 5, the PD can be installed in the projection device, and the instantaneous vibration phase can be determined by measuring the reflection angle when the laser light exits the light window. Since the vibration phase of the MEMS vibrating mirror is sinusoidally distributed, one PD can determine the sinusoidal distribution information, and more PDs help to measure the phase more accurately. In other embodiments, the PD can also be installed outside the projection device, for example, installed on the light window, for example, close to the edge of the light window to prevent the influence on the projection in the shooting area. In other embodiments, other methods can also be used for phase measurement, such as capacitance measurement.

In one embodiment, each image sensor completes the imaging of one image frame after each scanning projection performed by the projection device. For example, after the vibrating mirror vibrates for half a cycle to scan the stripe light in the x direction from one side of the imaging area to the other, it completes an image frame (for example, a pattern in FIG. 1 or FIG. 2) imaging. When the projected power of the projection device is limited, or the object to be measured is far away from the measuring head, the amount of charge acquired by the image sensor after a single scan usually cannot be imaged, and multi-scan imaging is required. Therefore, each image sensor completes the imaging of one image frame after each predetermined number of scanning projections by the projection device. For example, the DMD can scan the same structured light pattern in 5 consecutive vibration cycles, so that the image sensor can acquire enough charge for imaging, and then scan the same next structured light pattern in the next 5 vibration cycles, and so on.

Although a vibrating mirror used as a reflecting device is shown in FIG. 8, however, in other embodiments, the reflecting device can be a unidirectionally rotating mechanical rotating mirror for scanning and projecting the line-shaped light generated by the laser generator to the shooting area at the predetermined frequency. Correspondingly, the measuring device included in the synchronization device can be an angle measuring device for measuring the rotation angle of the motor of the reflecting device in real time. The synchronization device can then perform a synchronous activation of the imaging of the pixel columns based on the measurement results of the angle measuring device.

In the above embodiments, the synchronization between the exposure of the scan line and the column pixels is achieved by controlling the exposure of the image sensor. This can be used when the scanning of the light source is controllable (for example, the angle and rotation speed of the mechanical vibrating mirror can be controlled by voltage and current), but especially useful when the phase and speed of the light source scanning are not controllable (for example, for MEMS vibrating mirror or mechanical mirror rotation). Therefore, the MEMS vibrating mirror can use PD or capacitance to detect the angle, and the mechanical rotating mirror can also realize the position detection through voltage detection or photoelectric encoding.

Whether it is a vibrating mirror with controllable rotation speed and reciprocating motion, or a rotating mirror with uncontrollable rotation and one-way uniform motion, since its angular speed can match the progressive exposure speed of the rolling shutter image sensor, a progressive exposure scheme based on line laser scanning can be realized.

According to another embodiment of the present disclosure, it can also be implemented as a depth data calculation device, including: the depth data measuring head as described above; and a processor connected to the depth data measuring head, for determining the depth data of the object in the shooting area, according to the reference image of the image sensor and the set of image frames obtained by imaging the structured light under the monocular solution; or according to the predetermined relative positions of the first and second image sensors and the set of image frame pairs obtained by imaging the structured light under the binocular solution.

Figure 10:
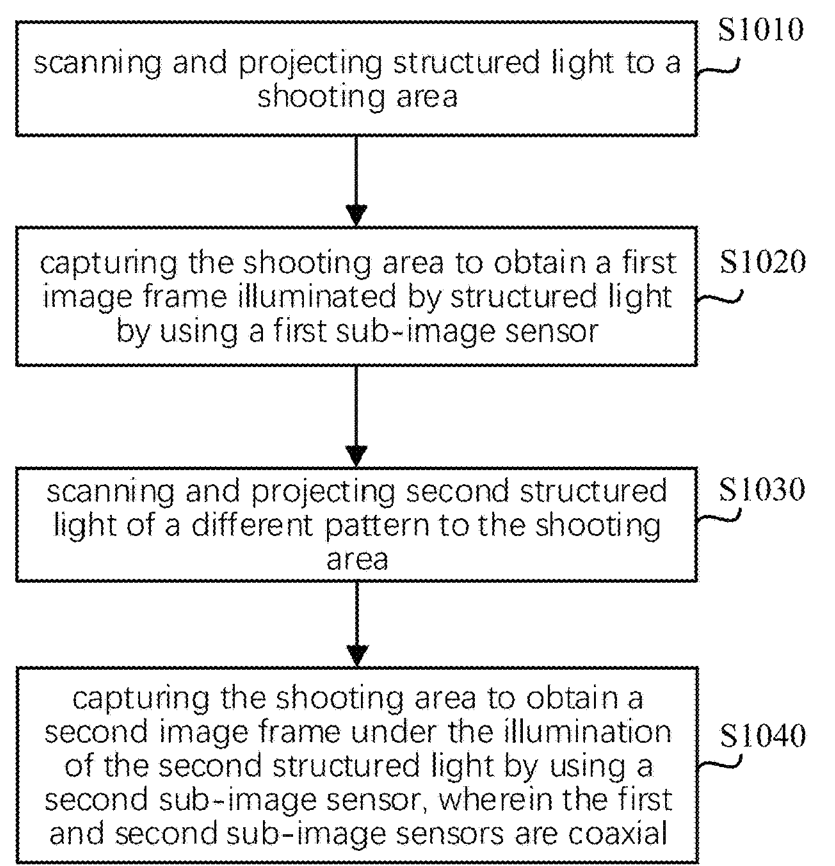
FIG. 10 shows a schematic flowchart of a depth measurement method according to an embodiment of the present disclosure.

According to another embodiment of the present disclosure, it can also be implemented as a method for measuring depth data. FIG. 10 shows a schematic flowchart of a depth measurement method according to an embodiment of the present invention. The method can be realized by using the depth data measuring head of the present invention.

In step S1010, scanning and projecting structured light (a first pattern) to a shooting area. In step S1020, capturing the shooting area to obtain a first image frame illuminated by structured light by using a first sub-image sensor (for example, the sub-image sensor 223, or the sub-image sensors 323 and 333). In step S1030. scanning and projecting second structured light of different patterns (a second pattern) to the shooting area. In step S1040, capturing the shooting area to obtain a second image frame under the illumination of the second structured light by using a second sub-image sensor (for example, sub-image sensor 224, or sub-image sensors 324 and 334), wherein the first and second sub-image sensors share at least part of an optical path and form an image sensor, the first and second image frames are used for a single depth data calculation of the shooting area.

In the binocular implementation, step S1020 can comprises: capturing the shooting area to obtain a first image frame pair illuminated by structured light by using a first sub-image sensor pair with a predetermined relative positional relationship (for example, 323 and 333). Step S1040 can comprises: capturing the shooting area to obtain a second image frame pair illuminated by the second structured light by using a second sub-image sensor pair (for example, 324 and 334), wherein the first and the second sub-image sensor pair is coaxial. That is, one sub-image in each of the first and second sub-image sensor pairs share at least part of an optical path and form a first image sensor, and the other sub-image sensors of the first and second sub-image sensor pairs share at least part of an optical path and form a second image sensor, and the first and second image frame pairs is used for a single depth data calculation of the shooting area.

Scanning and projecting different patterns of second structured light to the shooting area comprises: projecting the second structured light at a first interval which is smaller than a frame imaging interval of the sub-image sensors from the structured light is projected, and time interval between capturing the first image frame (pair) by the first sub-image sensor (pair) and capturing the second image frame (pair) by the second sub-image sensor (pair) is smaller than the frame imaging interval of the sub-image sensors.

In one embodiment, the method further comprises: scanning and projecting a third structured light to the shooting area, the pattern of the third structured light is different from that of the structured light and the second structured light; capturing the shooting area to obtain a third image frame (pair) under the illumination of a third structured light by using the first or second sub-image sensor (pair), wherein the third image frame (pair)s used for a single depth data calculation of the shooting area, or capturing the shooting area to obtain a third image frame (pair) under the illumination of the third structured light by using a third sub-image sensor (pair).

Wherein the third sub-image sensor belongs to the image sensor and shares at least part of the optical path with other sub-image sensors, the third image frame is used for a single depth data calculation of the shooting area. Specifically, in the binocular solution, one sub-image sensor of the third sub-image sensor pair belongs to the first image sensor and shares at least part of the optical path with other sub-image sensors in it, and the other sub-image sensor of the third sub-image sensor pair belongs to the second image sensor and shares at least part of the optical path with other sub-image sensors in it, and the third image frame pair is used for a single depth data calculation of the shooting area.

Scanning and projecting the third structured light to the shooting area comprises: projecting the third structured light at a second interval which is not smaller than a frame imaging interval of the sub-image sensors from the structured light is projected, and capturing the shooting area to obtain the third image frame (pair) illuminated by the third structured light by using the third sub-image sensor (pair).

In order to achieve coaxially, the first sub-image sensor (pair) and the second sub-image sensor (pair) can respectively acquire the split beams of the structured light and the second structured light, and selectively turning on the first sub-image sensor (pair) or the second sub-image sensor (pair) for capturing; or the optical path of the incident light is controlled so that only the first sub-image sensor pair acquires and captures the structured light, and only the second sub-image sensor pair acquires and captures the second structured light.

The present disclosure can also be implemented as a depth data calculation method, comprising: acquiring the first and second image frame (pair)s, or the first, second and third image frame (pair)s according to the depth data measuring method mentioned above; and determining the depth data of the object to be measured in the shooting area according to the first and second image frame (pair)s, or the first, second and third image frame (pair)s.

The multi-set coaxial monocular and binocular solutions according to the present disclosure have been described in detail above with reference to the accompanying drawings. By introducing multiple sets of coaxial photosensitive units, this solution can reduce the imaging time required for combining multiple frames to calculate depth data and increase the frame rate.

The depth data measuring head of the present disclosure and its corresponding depth data measurement solution are especially suitable for the combination of line-shaped light stripe pattern projection and rolling shutter exposure, thereby realizing depth data measurement with high anti-interference coefficient. Specifically, the depth data measurement solution of the present disclosure is especially suitable for measuring target objects outdoors, for example, under sunlight, and can be implemented as a car damage tester, for example.

Those of skill would also appreciate that the various illustrative logical blocks, modules, circuits, and algorithm steps described in connection with the disclosure herein may be implemented as electronic hardware, computer software, or combinations of both.

The flowchart and block diagrams in the figures illustrate the architecture, functionality, and operation of possible implementations of systems and methods according to various embodiments of the present disclosure. In this regard, each block in a flowchart or block diagram may represent a module, program segment, or part of code that includes one or more Executable instructions. It should also be noted that, in some alternative implementations, the functions noted in the block may occur out of the order noted in the figures. For example, two blocks in succession may, in fact, be executed substantially concurrently, or they may sometimes be executed in the reverse order, depending upon the functionality involved. It should also be noted that each block of the block diagrams and/or flowchart illustrations, and combinations of blocks in the block diagrams and/or flowchart illustrations, can be implemented by a dedicated hardware-based system that performs the specified functions or operations, or may be implemented by a combination of dedicated hardware and computer instructions.

Having described various embodiments of the present disclosure, the foregoing description is exemplary, not exhaustive, and is not limited to the disclosed embodiments. Many modifications and alterations will be apparent to those of ordinary skill in the art without departing from the scope and spirit of the described embodiments. The terminology used herein is chosen to best explain the principle of each embodiment, practical application or improvement of technology in the market, or to enable other ordinary skilled in the art to understand each embodiment disclosed herein.

What is claimed is:

1. A depth data computing device, comprising:

a projection device for scanning and projecting a set of structured light having different patterns to a shooting area, and the set of structured lights includes at least two structured lights of different patterns;

first and second image sensors having a predetermined relative positional relationship for capturing the shooting area to obtain a set of image frame pairs illuminated by the set of structured light; and a processor connected to the projection device and the first and second image sensors, configured to determine the depth data of an object in the shooting area according to the set of image frame pairs obtained by imaging the structured light, wherein, each of the first and second image sensors comprises at least a first sub-image sensor and a second sub-image sensor that share at least part of an optical path, the first sub-image sensors of the first and second image sensors form a first binocular sub-image sensor pair used to image the structured light of a first pattern among the different patterns sequentially projected by the projection device, and the second sub-image sensors of the first and second image sensors form a second binocular sub-image sensor pair used to image the structured light of a second pattern among the different patterns sequentially projected by the projection device after the first pattern.

2. The depth data computing device according to claim 1, comprising:

synchronization device for making the first binocular sub-image sensor pair and the second binocular sub-image sensor pair to sequentially image the at least two structured light of different patterns, wherein the first binocular sub-image sensor pair images simultaneously, the second binocular sub-image sensor pair images simultaneously, with a first interval therebetween, the first interval being smaller thana frame imaging interval of the sub-image sensor, while the projection device projects the structured light of the first pattern and the second pattern with the first interval therebetween, and making each of the first and second sub-image sensor perform its next frame imaging at a second interval not smaller than the frame imaging interval of the sub-image sensor, and is synchronized with the projection of the projection device.

3. The depth data computing device according to claim 1, wherein each of the first and second image sensors comprises:

lens assembly for receiving incident return structured light;

a beam splitting device for splitting the incident return structured light into at least a first beam and a second beam, wherein the first sub-image sensor images the first light beam corresponding to the returning structured light with the first pattern, and the second sub-image sensor images the second light beams corresponding to the returning structured light with the second pattern.

4. The depth data computing device according to claim 1, wherein each of the first and second image sensors comprises:

lens assembly for receiving incident return structured light;

an optical path conversion device for delivering the incident return structured light to at least a first sub-path and a second sub-path, wherein the first sub-image sensor images the returning structured light corresponding to the first pattern on the first sub-path, and the second sub-image sensor images the returned structured light corresponding to the second different pattern on the second sub-path.

5. The depth data computing device according to claim 1, wherein in each of the first and second image sensors, the first sub-image sensor and the second sub-image sensor that share at least part of the optical path have the same optical path length.

6. The depth data computing device according to claim 5, wherein in each of the first and second image sensors, the first sub-image sensor and the second sub-image sensor that share at least part of the optical path are aligned at the pixel level.

7. The depth data computing device according to claim 1, wherein each sub-image sensor is an infrared light sensor.

8. The depth data computing device according to claim 1, wherein the set of structured lights with different patterns projected by the projection device is a set of structured lights with different coded stripes.

9. The depth data computing device according to claim 1, wherein the projection device comprises:

a laser generator for generating line-shaped and/or point laser light, and the laser generator performs high-speed switching to scan and project light and dark structured light corresponding to the stripe code.

10. The depth data computing device according to claim 9, wherein the projection device comprises:

a light emitting device for generating line-shaped light; and a reflecting device for reflecting the line-shaped light to project the line-shaped light moving in a direction perpendicular to the stripe direction to the shooting area.

11. The depth data computing device according to claim 9, wherein each sub-image sensor is a global image sensor.

12. The depth data computing device according to claim 11, wherein in each of the first and second image sensors, the first sub-image sensor and the second sub-image sensor that share at least part of the optical path are installed upside down from each other.

13. The depth data computing device according to claim 9, wherein each sub-image sensor is a rolling shutter image sensor, and the depth data computing device further comprises:

a column synchronization device, for synchronously enabling the pixel column in the stripe direction corresponding to the current scanning position in the sub-image sensor currently used for imaging to perform imaging based on the scanning position of the projection device.

14. The depth data computing device according to claim 9, wherein, each of the first and second image sensors comprises a beam splitting device, and the one sub-image sensor of the first binocular sub-image sensor pair and the one sub-image sensor of the second binocular sub-image sensor pair share the optical path until a beam splitting surface of the beam splitting device in the first image sensor, and the other sub-image sensor of the first binocular sub-image sensor pair and the other sub-image sensor of the second binocular sub-image sensor pair share the optical path until a beam splitting surface of the beam splitting device in the second image sensor.

15. The depth data computing device according to claim 1, wherein, each of the first and second image sensors further comprises a beam splitting device, the first sub-image sensor and the second sub-image sensor of each of the first and second image sensors share the optical path until a beam splitting surface of the beam splitting device.

16. A method for measuring depth data, comprising:

scanning and projecting first structured light to a shooting area;

capturing the shooting area to obtain a first image frame pair illuminated by first structured light of a first pattern by using a first binocular sub-image sensor pair with a predetermined relative positional relationship;

after the projection of the first structured light, scanning and projecting second structured light of a second pattern to the shooting area, the second pattern is different from the first pattern;

capturing the shooting area to obtain a second image frame pair under the illumination of the second structured light by using a second binocular sub-image sensor pair with a predetermined relative positional relationship, wherein one sub-image sensor of the first binocular sub-image sensor pair and one sub-image sensor of the second binocular sub-image sensor pair share at least part of an optical path and form a first image sensor, and the other sub-image sensor of the first binocular sub-image sensor pair and the other sub-image sensor of the second binocular sub-image sensor pair share at least part of an optical path and form a second image sensor; and determining the depth data of the object to be measured in the shooting area according to the first and second image frame pairs.

17. The method according to claim 16, wherein scanning and projecting second structured light of the second pattern to the shooting area comprises:

projecting the second structured light after the projection of the first structured light, with a first interval therebetween, the first interval being smaller than a frame imaging interval of the sub-image sensor, and time interval between capturing the first image frame pair by the first binocular sub-image sensor pair and capturing the second image frame pair by the second binocular sub-image sensor pair is smaller than the frame imaging interval of the sub-image sensors.

18. The method according to claim 17, further comprising:

projecting a third structured light of a third pattern to the shooting area after the projection of the second structured light, with a second interval therebetween, the second interval being not smaller than the frame imaging interval of the sub-image sensors, the third pattern is different from the first pattern and the second pattern;

capturing the shooting area to obtain a third image frame pair under the illumination of the third structured light by using the first binocular sub-image sensor pair, wherein the third image frame pair is used to determine the depth data of the shooting area.

19. The method according to claim 17, further comprising:

projecting a third structured light of a third pattern to the shooting area after the projection of the second structured light, with the first interval therebetween, the third pattern is different from the first pattern and the second pattern; and capturing the shooting area to obtain a third image frame pair under the illumination of the third structured light by using a third sub-image sensor pair, wherein one sub-image sensor of the third sub-image sensor pair belongs to the first image sensor and shares at least part of the optical path with other sub-image sensors of the first image sensor, the other sub-image sensor of the third sub-image sensor pair belongs to the second image sensor and shares at least part of the optical path with other sub-image sensors of the second image sensor, the third image frame pair is used to determine the depth data of the shooting area.

20. The method according to claim 16, wherein in each of the first and second image sensors, the first sub-image sensor and the second sub-image sensor respectively acquire the split beams of the first structured light and the second structured light, and selectively turning on one of the first sub-image sensor and the second sub-image sensor for capturing.

21. The method according to claim 16, wherein the optical path of the incident light is controlled so that in each of the first and second image sensors, only the first sub-image sensor acquires and captures the first structured light, and only the second sub-image sensor acquires and captures the second structured light.

* * * * *